(12) United States Patent
Yang (10) Patent No.: US 8,726,979 B2
(45) Date of Patent: May 20, 2014

(54) HEAT EXCHANGE APPARATUS WITH AUTOMATIC HEAT EXCHANGE FLUID FLOW RATE EXCHANGE MODULATION

(76) Inventor: Tai-Her Yang, Dzan-Hwa (TW)

( * ) Notice: Subject to any disclaimer, the term of this patent is extended or adjusted under 35 U.S.C. 154(b) by 1050 days.

(21) Appl. No.: 12/318,196

(22) Filed: Dec. 23, 2008

(65) Prior Publication Data

US 2010/0155044 A1 Jun. 24, 2010

(51) Int. Cl.
*F28F 27/00* (2006.01)

(52) U.S. Cl.
USPC ............... 165/200; 165/11.1; 165/297; 137/1

(58) Field of Classification Search
USPC ................... 165/11.1, 200, 201, 297; 137/1; 417/371
See application file for complete search history.

(56) References Cited

U.S. PATENT DOCUMENTS

| | | | | | |
|---|---|---|---|---|---|
| 3,699,006 | A | * | 10/1972 | Hasslacher | 203/4 |
| 4,525,242 | A | * | 6/1985 | Iida | 203/11 |
| 5,695,720 | A | * | 12/1997 | Wade et al. | 422/82 |
| 5,778,671 | A | * | 7/1998 | Bloomquist et al. | 417/371 |
| 6,257,265 | B1 | * | 7/2001 | Brunner et al. | 137/1 |
| 6,259,074 | B1 | * | 7/2001 | Brunner et al. | 219/494 |
| 6,383,672 | B1 | * | 5/2002 | Fujita | 165/297 |
| 7,681,404 | B2 | * | 3/2010 | Bean, Jr. | 361/699 |
| 8,051,828 | B2 | * | 11/2011 | Sengupta et al. | 123/304 |
| 8,602,087 | B2 | * | 12/2013 | Yang | 165/11.1 |

* cited by examiner

*Primary Examiner* — Ljiljana Ciric
(74) *Attorney, Agent, or Firm* — Bacon & Thomas, PLLC (57) ABSTRACT

A heat exchange apparatus has four fluid ports through which a heat exchange fluid is pumped into and out of the heat exchange apparatus. First and fourth ones of the fluid sorts are on a first side of the heat exchange apparatus and second and third ones of the fluid ports (are on a second side of the heat exchange apparatus. At least two fluid pumps form a double flow circuit fluid pumping device for pumping the fluid in the first direction from the first fluid port to the second fluid port and in the second direction from the third fluid port to the fourth fluid port. One or more of a temperature detecting device, humidity detecting device, and gaseous or liquid state fluid composition detecting device are installed at a position capable of detecting the temperature, humidity, and fluid composition changes of the exchange fluid. The detected signals are used as references for modulating the pumping flow rate of exchange fluid.

22 Claims, 6 Drawing Sheets

HEAT EXCHANGE APPARATUS WITH AUTOMATIC HEAT EXCHANGE FLUID FLOW RATE EXCHANGE MODULATION

BACKGROUND OF THE INVENTION (a) Field of the Invention

The present invention improves the conventional fixed type double flow circuit heat exchange apparatus by adding an automatic exchange fluid flow rate modulation function so as to timely change the temperature distribution status between the fluid and the heat exchanger, or to modulate the composition ratio of the gaseous or liquid state pumping fluid, and further by arranging a heat exchanger inside the fixed type heat exchange apparatus to be insertingly installed or coated with penetrating type or absorbing type moisture absorbing material, or by adapting the heat exchanger itself to have a concurrent dehumidification function to include a dehumidification effect in the total heat exchange function.

(b) Description of the Prior Art

The conventional double flow circuit heat reclaim device or total heat reclaim device, through which a gaseous or liquid state pumping fluid is passed, may include:

1) a fixed type fluid heat reclaim device;
2) a fixed type fluid total heat reclaim device;
3) a rotary type fluid heat reclaim device; or
4) a rotary type fluid total heat reclaim device.

Such heat reclaim devices are usually selected to operate at a set flow speed, and hence their heat exchange efficiency is affected by the temperature difference between the input and output sides, or fluid composition differences in the heat exchange spaces between the gaseous or liquid state fluids, or differences in fluid flow speeds and temperature differences in the heat exchange spaces between the gaseous or liquid state fluids. Further, the conventional heat exchangers are unable to modulate the heat exchange flow rate so as to modulate the fluid composition difference between the gaseous or liquid state fluids in the heat exchange spaces, or to achieve an automatic modulation function that proactively modulates the heat exchange flow rate, thereby achieving an energy saving effect by matching the temperature difference or humidity difference.

SUMMARY OF THE INVENTION

The present invention modifies the conventional fixed type double flow circuit heat exchange apparatus to include automatic exchange fluid flow rate modulation, thereby modulating the flow rate, temperature distribution, humidity distribution, and gaseous or liquid state compositions of the exchange fluid.

DESCRIPTION OF MAIN COMPONENT SYMBOLS

11: Temperature detecting device
21: Humidity detecting device
31: Gaseous or liquid state fluid composition detecting device
100: Heat exchanger
111, 112: Bidirectional fluid pump capable of producing negative pressure or positive pressure
120a, 120b, 120c, 120d: Unidirectional fluid pump
123: Double flow circuit fluid pumping device
200: Total heat exchanger
300: power source
250: Operative control device
1000: Heat exchange apparatus
a, b, c, d: Fluid port

DETAILED DESCRIPTION OF THE PREFERRED EMBODIMENTS

Figure 1:
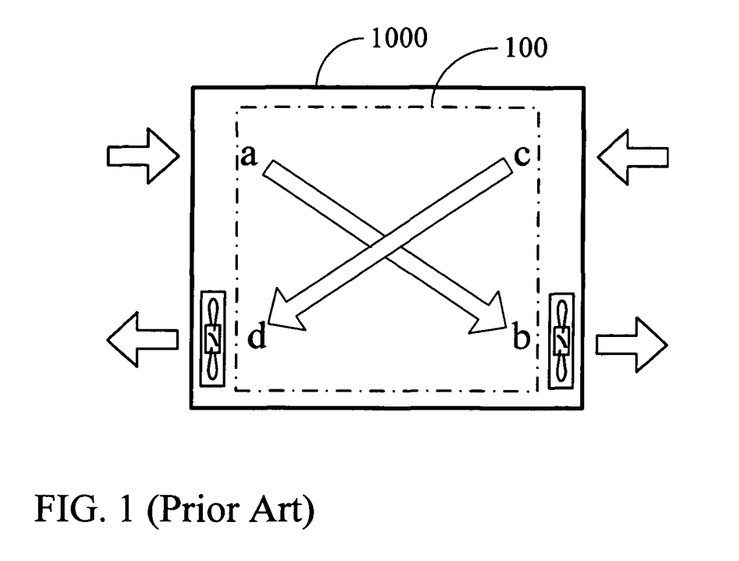
FIG. 1 is a schematic view showing the operating principles of a conventional double flow circuit heat exchange apparatus or total heat exchange apparatus.

FIG. 1 is a schematic view showing the operating principles of the conventional double flow circuit heat exchange apparatus or total heat exchange apparatus. As shown in FIG. 1, the conventional double flow circuit heat exchange apparatus is usually installed with two fluid pumping devices in different flow directions and four fluid ports for pumping two fluid streams having a temperature difference in different flow directions through the two sides of the heat exchanger (100) inside the heat exchange apparatus (1000). The two fluid steams are respectively pumped into the heat exchanger (100) inside the heat exchange apparatus (1000) via the two fluid ports at two different ends and are discharged via the fluid ports on the other side. As a result, taking the example of the heat exchange apparatus for indoor to outdoor air exchange in winter, the indoor higher temperature air flow is pumped into the heat exchange apparatus (1000) via fluid port (a), passes through the flow circuit on one side of the heat exchanger (100), and then is discharged to the outside via fluid port (b), and the lower temperature outdoor fresh air is pumped into the heat exchange apparatus (1000) via fluid port (c) from the outside, passes through the flow circuit on the other side of the heat exchanger (100), and then is discharged to the indoor via fluid port (d). Fluid port (a) and fluid port (d) are disposed at the side passing to the indoors, while the fluid port (c) and fluid port (b) are disposed at the side passing to the outdoors. During stable operation, one side of the heat exchanger (100) inside the heat exchange apparatus (1000) between fluid port (a) and fluid port (b) forms a temperature distribution from a higher temperature at fluid port (a) that gradually decreases to the lower temperature at fluid port (b), and the other side of the heat exchanger (100) between fluid port (c) and fluid port (d) forms a temperature distribution from the lower temperature at fluid port (c) to gradually increase to the higher temperature at fluid port (d). The heat exchange efficiency is decided by the fluid properties, flow speed and characteristics of the heat exchanger in the heat exchange apparatus as well as the temperature difference of the two side fluids. If the heat exchanger is insertingly installed or coated with penetrating type or absorbing type moisture absorbing material, or the heat exchanger itself has a concurrent dehumidification function applied to the total heat exchanger, then the above fluids in the two different flow directions provide a stable temperature difference and humidity saturation difference at the two inlet/outlet ends and the two sides for passing the fluid in different flow directions of the total heat exchanger (200) inside the heat exchange apparatus (1000).

According to the present invention, the conventional fixed type double flow circuit heat exchange apparatus is made to have the operating function of a fixed type double flow circuit heat exchange apparatus having automatic exchange fluid flow rate modulation, and in particular modulation of the flow rate, temperature distribution, humidity distribution, and gaseous or liquid state compositions of the exchange fluid.

Figure 2:
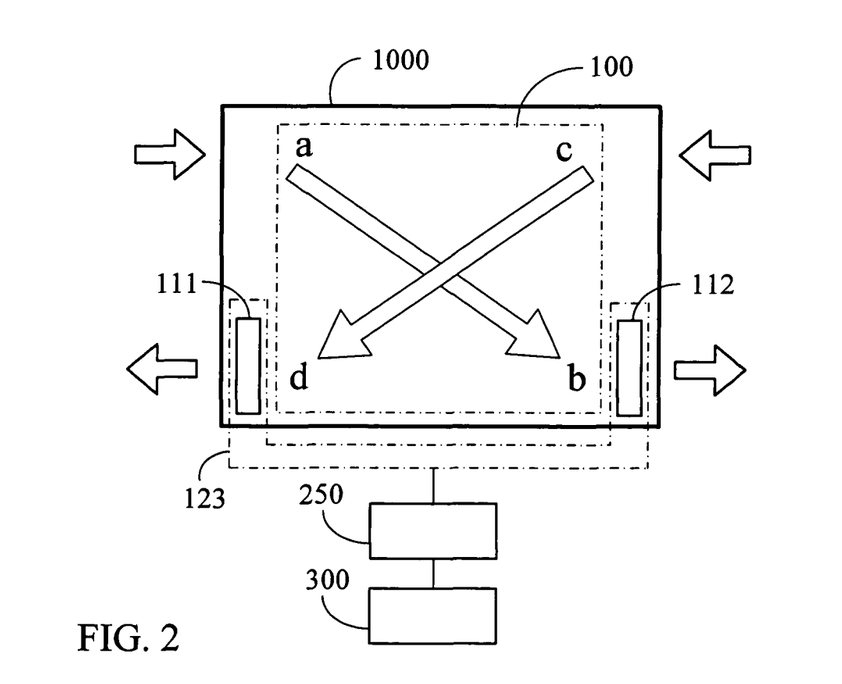
FIG. 2 is a first structural block schematic view of an embodiment of the present invention capable of automatically operatively controlling the flow rate of heat exchange fluid.

FIG. 2 is a first structural block schematic view of the embodiment of the present invention capable of automatically operatively controlling the flow rate of heat exchange fluid.

As shown in FIG. 2, a fluid port (b) and fluid port (d), among the fluid port (a), fluid port (b), fluid port (c), and fluid port (d) of the double flow circuit of the heat exchange apparatus (1000), are respectively installed with bidirectional fluid pumps (111, 112) capable of producing negative pressure or positive pressure to constitute a double flow circuit fluid pumping device (123). by using the power of power source (300), the bidirectional fluid pumps (111, 112) are capable of producing the negative pressure or positive pressure of the double flow circuit fluid pumping device (123) under the operative control of the operative control device (250) to pump the two fluids passing through the heat exchanger (100) in different flow directions.

The heat exchange apparatus (1000) and the bidirectional fluid pumps (111, 112) capable of producing negative pressure or positive pressure are integrally combined or separately installed, and the two bidirectional fluid pumps (111, 112) capable of producing negative pressure or positive pressure constituting the double flow circuit fluid pumping device (123) function are respectively installed at fluid port (b) and fluid port (d) so as to pump the fluid in different pumping flow directions The bidirectional fluid pumps (111, 112) capable of producing negative pressure or positive pressure are respectively driven by individual electric motors or are commonly driven by the same motor, and are operatively controlled by the operative control device (250) to operate in one or more than one of the following functional modes: 1) the two bidirectional fluid pumps (111, 112) generate negative pressure to allow the two fluid streams to pass through the heat exchanger (100) in different pumping flow directions; 2) the two bidirectional fluid pumps (111, 112) generate positive pressure to allow the two fluid streams to pass through the heat exchanger (100) in different pumping flow directions.

The power source (300) includes any AC or DC city power system or independent power supply device capable of providing power for the operation of the fixed type heat exchange apparatus with automatic exchange flow rate modulation.

The operative control device (250) is constituted by electromechanical components, solid state electronic components, or microprocessors and related software and operative control interfaces to operatively control the bidirectional fluid pumps (111, 112) of the double flow circuit fluid pumping device (123) by: 1) operatively controlling the switching operation; or 2) operatively controlling the flow rate of the pumping heat exchange fluid; or 3) operatively controlling the temperature distribution status between the fluid and the heat exchanger (100) inside the heat exchange apparatus (1000); or 4) integrally operatively controlling at least two of the above-listed items 1), 2) & 3) in combination.

The heat exchanger (100) is the heat exchanger in a conventional heat exchange structure having two internal flow circuits and a heat absorbing or dissipating function. The two flow circuits respectively individually have two fluid ports to respectively pump the fluid, so as to enable heat exchange between the two fluids.

The timing to operatively control the flow rate of heat exchange fluid is that: 1) the fluid flow rate and change timing are preset in the open loop operative control; or 2) the flow rate is randomly manually controlled;

In addition, the bidirectional fluid pump (111) and the bidirectional fluid pump (112) can also be installed at fluid ports (a, d) or installed at fluid ports (b, c) in the embodiment of FIG. 2, wherein one bidirectional fluid pump generates positive pressure while the other bidirectional fluid pump generates negative pressure so as to allow the two fluid streams to pass through the heat exchanger (100) in different pumping flow directions.

Figure 3:
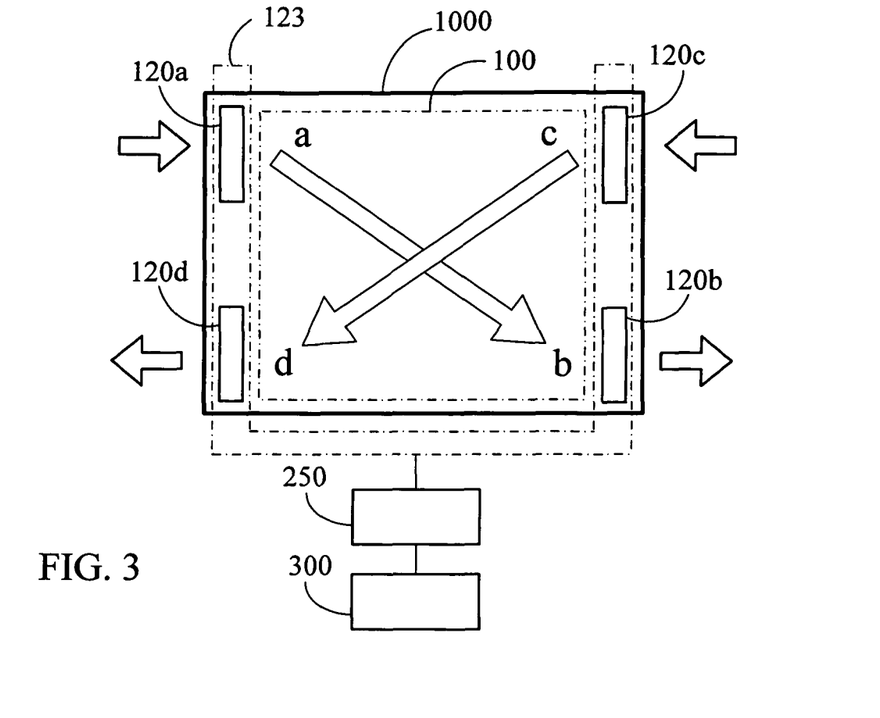
FIG. 3 is a second structural block schematic view of an embodiment of the present invention capable of automatically operatively controlling the flow rate of heat exchange fluid.

FIG. 3 is a second structural block schematic view of an embodiment of the present invention capable of automatically controlling the flow rate of heat exchange fluid.

As shown in FIG. 3, unidirectional fluid pumps (120a, 120b, 120c, 120d) capable of pumping in unidirectional flow directions are respectively installed at the fluid port (a), fluid port (b), fluid port (c), and fluid port (d) of the two flow circuits for passing two flow circuit fluids in the heat exchange apparatus (1000) to constitute a double flow circuit fluid pumping device (123). Power is supplied by a power source via the operative control device (250) to operatively control the two fluid streams being pumped by the double flow circuit fluid pumping device (123) to pass through the heat exchanger (100) in different flow directions.

The heat exchange apparatus (1000) and unidirectional fluid pumps (120a, 120b, 120c, 120d) are integrally combined or separately installed to provide the functions of the double flow circuit fluid pumping device (123). The unidirectional fluid pumps (120a, 120c) installed at fluid port (a) and fluid port (c) are one group to be driven by individual electric motors or driven by a common motor, while the unidirectional fluid pumps (120b, 120d) installed at fluid port (b) and fluid port (d) are another group to be driven by individual electric motors or driven by a common motor, the four unidirectional fluid pumps being operatively controlled by the operative control device (250) to have one or more than one of the following configurations and operating modes: 1) the unidirectional fluid pumps are structurally distributed to pump the fluid in negative pressure, thereby allowing the two fluid streams to appear in different flow directions; or 2) the unidirectional fluid pumps are structurally distributed to pump the fluid in positive pressure, thereby allowing the two fluid streams to appear in different flow directions; or 3) some or all of the different unidirectional fluid pumps (120a, 120b, 120c, 120d) are pumped in positive pressure and negative pressure to provide auxiliary pumping in the same flow circuit and allow the two fluid streams to be pumped in different flow directions. in each of the operating modes or configurations 1), 2) and 3), the flow directions of the two fluid streams passing through the two sides of the heat exchanger (100) inside the heat exchange apparatus (1000) are kept opposite to each other.

The power source (300) may again include any AC or DC city power system or independent power supply device to provide power for operation of the fixed type heat exchange apparatus with automatic exchange flow rate modulation.

The operative control device (250) is constituted by electromechanical components, solid state electronic components, or microprocessors and related software and operative control interfaces to operatively control the unidirectional fluid pumps (120a, 120b, 120c, 120d) of the double flow circuit fluid pumping device (123) by: 1) operatively controlling the switching functional operation; or 2) operatively controlling the flow rate of the pumping heat exchange fluid; or 3) operatively controlling the temperature distribution status between the fluid and the heat exchanger (100) in the heat exchange apparatus (1000); or 4) integrally operatively controlling at least two of items 1), 2) & 3) in combination.

The heat exchanger (100) is the heat exchanger of a conventional heat exchange structure having two internal flow circuits and a heat absorbing or dissipating function, wherein the two flow circuits respectively individually have two fluid ports to respectively pump the fluid, so as to enable heat exchange between the two fluids.

The timing to operatively control the flow rate of the heat exchange fluid is controlled as follows: 1) the fluid flow rate and change timing are preset in the open loop operative control; or the timing is randomly manually operatively controlled.

Figure 4:
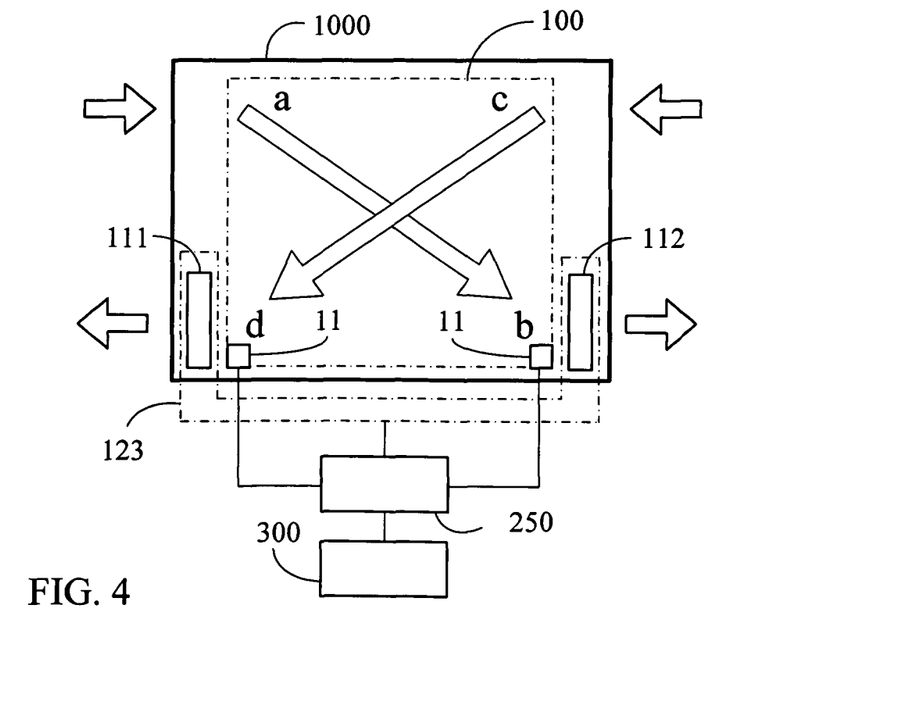
FIG. 4 is the first structural block schematic view of an embodiment of the present invention that is further installed with a temperature detecting device in a heat exchanger application.

FIG. 4 is a first structural block schematic view of an embodiment in which the present invention is further installed with a temperature detecting device in a heat exchanger application.

As shown in FIG. 4, in this embodiment of the present invention, the fluid port (b) and fluid port (d) among the fluid port (a), fluid port (b), fluid port (c), and fluid port (d) of the double flow circuit of the heat exchange apparatus (1000) are respectively installed with the bidirectional fluid pumps (111, 112) capable of producing negative pressure or positive pressure to form the double flow circuit fluid pumping device (123), and the two fluid streams are pumped by the bidirectional fluid pumps (111, 112) capable of producing negative pressure or positive pressure of the double flow circuit fluid pumping device (123) and driven by the power source (300) and operatively controlled by the operative control device (250) to pass through the heat exchanger (100) in different flow directions.

The heat exchange apparatus (1000) and the bidirectional fluid pumps (111, 112) capable of producing negative pressure or positive pressure are integrally combined or separately installed; the two bidirectional fluid pumps (111, 112) capable of producing negative pressure or positive pressure constituting the functions of double flow circuit fluid pumping device (123) are respectively installed to fluid port (b) and fluid port (d) for pumping the fluid in different pumping flow directions, wherein the bidirectional fluid pumps (111, 112) capable of producing negative pressure or positive pressure are driven by individual electric motors or driven by a common motor and operatively controlled by the operative control device (250) to have one or more than one of the following functional mode operations, as needed: 1) the two bidirectional fluid pumps (111, 112) are pumped in negative pressure to allow the two fluid streams to pass through the heat exchanger (100) in different pumping flow directions; and 2) the two bidirectional fluid pumps (111, 112) are pumped in positive pressure to allow the two fluid streams to pass through the heat exchanger (100) in different pumping flow directions.

In this embodiment, the at least one temperature detecting device (11) is installed at the position capable of directly or indirectly detecting the temperature variation of the exchange fluid, wherein the detected signals are referred by the operative control device (250) to operatively control the double flow circuit fluid pumping device (123) for determining the flow rate operative control timing of the pumping exchange fluid;

The power source (300) may be any device including an AC or DC city power system or independent power supply device to provide power source for the operation of the fixed type heat exchange apparatus with automatic exchange flow rate modulation.

The operative control device (250) is constituted by electromechanical components, solid state electronic components, or microprocessors and related software and operative control interfaces to operatively control the bidirectional fluid pumps (111, 112) of the double flow circuit fluid pumping device (123) by: 1) operatively controlling the switching functional operation; or 2) operatively controlling the flow rate of the pumping heat exchange fluid; or 3) operatively controlling the temperature distribution status between the fluid and the heat exchanger (100) inside the heat exchange apparatus (1000); or 4) integrally operatively controlling at least two of the items 1), 2) & 3) in combination.

The heat exchanger (100) is the heat exchanger in a conventional heat exchange structure having two internal flow circuits and a heat absorbing or dissipating function, wherein the two flow circuits respectively individually have two fluid ports to respectively pump the fluid, so as to enable heat exchange between the two fluids.

The timing to operatively control the flow rate of heat exchange fluid is controlled as follows: 1) the fluid flow rate and change timing are preset in the open loop operative control; or 2) the timing is randomly manually operatively controlled; or 3) at least one temperature detecting device (11) is installed at the position capable of directly or indirectly detecting the temperature variation of the exchange fluid, wherein the detected signal is used as the reference to operatively control the flow rate operating timing of the pumping exchange fluid.

Further, the bidirectional fluid pump (111) and the bidirectional fluid pump (112) can also be installed to fluid ports (a, d), or installed to fluid ports (b, c) in the embodiment of FIG. 4, wherein one bidirectional fluid pump is pumped in positive pressure while the other bidirectional fluid pump is pumped in negative pressure so as to allow the two fluid streams to pass through the heat exchanger (100) in different pumping flow directions.

Figure 5:
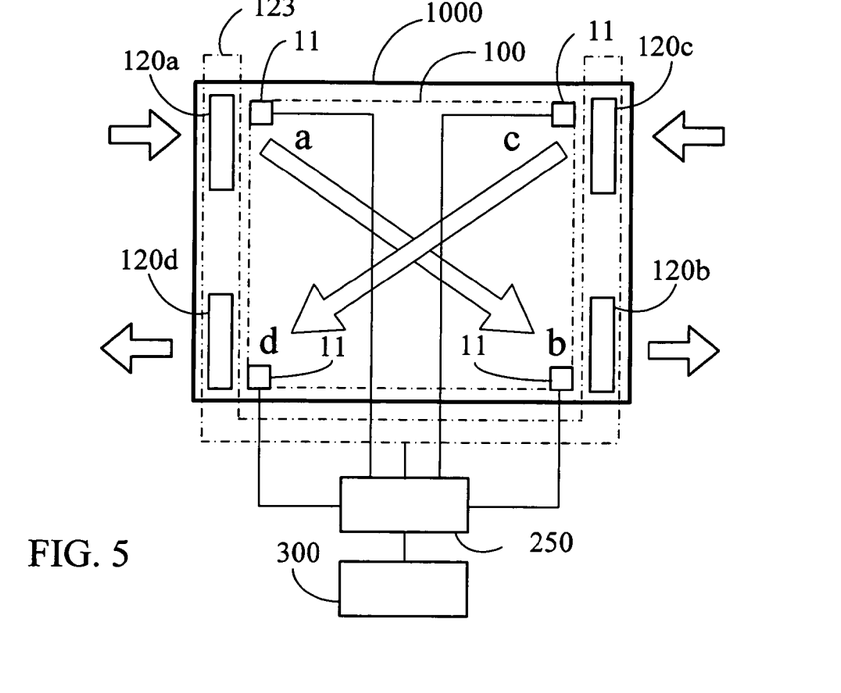
FIG. 5 is a second structural block schematic view of an embodiment of the present invention that is further installed with the temperature detecting device in the heat exchanger application.

FIG. 5 is a second structural block schematic view of the embodiment in which the heat exchange apparatus is further installed with a temperature detecting device.

As shown in FIG. 5, the unidirectional fluid pumps (120a, 120b, 120c, 120d) capable of pumping in unidirectional flow directions are respectively installed to the fluid port (a), fluid port (b), fluid port (c), and fluid port (d) of the two flow circuits for pumping the two double flow circuit fluids in the heat exchange apparatus (1000) and form a double flow circuit fluid pumping device (123). Power supply from the power source (300) is controlled by the operative control device (250) to operatively control the two fluid streams being pumped by the double flow circuit fluid pumping device (123) to pass through the heat exchanger (100) in different flow directions.

The heat exchange apparatus (1000) and unidirectional fluid pumps (120a, 120b, 120c, 120d) are integrally combined or separately installed to constitute the functions of the double flow circuit fluid pumping device (123). The four unidirectional fluid pumps (120a, 120b, 120c, 120d) are respectively installed to fluid port (a), fluid port (b), fluid port (c), and fluid port (d) for pumping the fluid, wherein the unidirectional fluid pumps (120a, 120c) installed to fluid port (a) and fluid port (c) are one group to be driven by the individual electric motors or driven by a common motor, while the unidirectional fluid pumps (120b, 120d) installed to fluid port (b) and fluid port (d) are another group to be driven by the individual electric motors or driven by a common motor, the two groups being operatively controlled by the operative control device (250) to have one or more than one of the following functional modes or structural types and operating methods: 1) the unidirectional fluid pumps are structurally distributed to pump the fluid in negative pressure, thereby allowing the two fluid streams to appear in different flow directions; or 2) the unidirectional fluid pumps are structurally distributed to pump the fluid in positive pressure, thereby allowing the two fluid streams to appear in different flow directions; or 3) the different fluid pumps among part or all of the unidirectional fluid pumps (120a, 120b, 120c, 120d) are pumped in positive pressure and negative pressures to form auxiliary pumping in the same flow circuit and allow the two fluid streams to be pumped in different flow directions. In the functional mode operations of items 1), 2) and 3), the flow directions of the two fluid streams passing through the two sides of the heat exchanger (100) inside the heat exchange apparatus (1000) are kept opposite to each other.

The at least one temperature detecting device (11) is installed at a position capable of directly or indirectly detecting the temperature variation of the exchange fluid, wherein the detected signals are referred by the operative control device (250) to operatively control the double flow circuit fluid pumping device (123) for determining the flow rate operating timing of the pumping exchange fluid.

The power source (300) is any device including an AC or DC city power system or independent power supply device to provide power for the operation of the fixed type heat exchange apparatus with automatic exchange flow rate modulation.

The operative control device (250) is constituted by electromechanical components, solid state electronic components, or microprocessors and related software and operative control interfaces to operatively control unidirectional fluid pumps (120a, 120b, 120c, 120d) of the double flow circuit fluid pumping device (123) by: 1) operatively controlling the switching functional operation; or 2) operatively controlling the flow rate of the pumping heat exchange fluid; or 3) operatively controlling the temperature distribution status between the fluid and the heat exchanger (100) inside the heat exchange apparatus (1000); or 4) integrally operatively controlling at least two of items 1), 2) and 3) in combination.

The heat exchanger (100) is the heat exchanger in a conventional heat exchange structure having two internal flow circuits and a heat absorbing or dissipating function, wherein the two flow circuits respectively individually have two fluid ports to respectively pump the fluid, so as to enable heat exchange between the two fluids.

The timing to operatively control the flow rate of heat exchange fluid is achieved in the follow manner: 1) the fluid flow rate and change timing are preset in the open loop operative control; or 2) the timing is randomly manually operatively controlled; or 3) at least one temperature detecting device (11) is installed at a position capable of directly or indirectly detecting the temperature variation of the exchange fluid, wherein the detected signal is used as the reference to operatively control the flow rate operating timing of the pumping exchange fluid.

Figure 6:
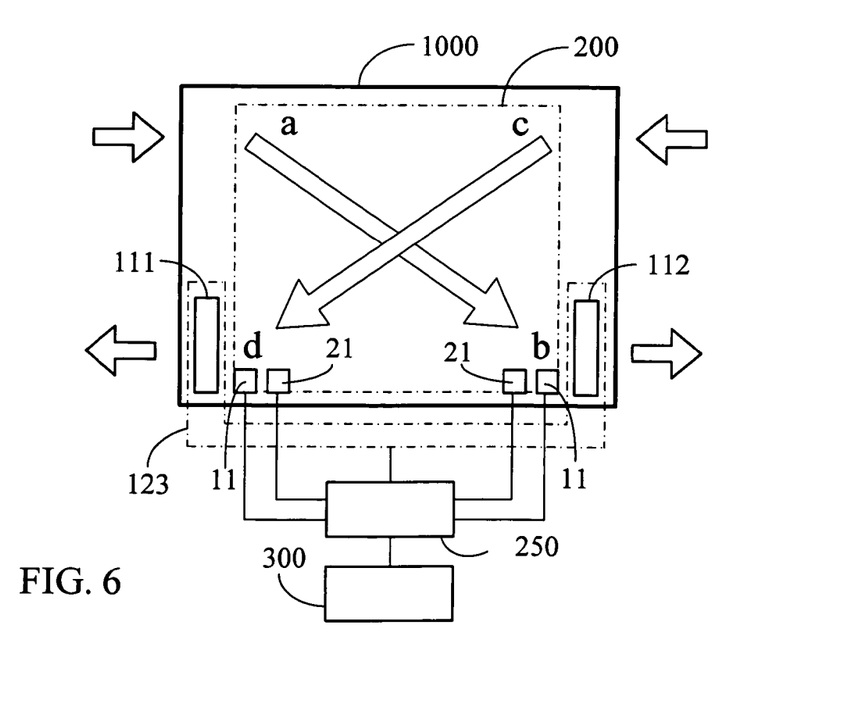
FIG. 6 is a first schematic view of an embodiment of the present invention that is further installed with the temperature detecting device and the humidity detecting device in a total heat exchanger application.

FIG. 6 is a first schematic view of an embodiment of the present invention that is further installed with a temperature detecting device and a humidity detecting device in a total heat exchanger application.

As shown in FIG. 6, the bidirectional fluid pumps (111, 112) capable of producing negative pressure or positive pressure are respectively installed to the fluid port (b) and fluid port (d) among the fluid port (a), fluid port (b), fluid port (c), and fluid port (d) of the double flow circuit of the heat exchange apparatus (1000) to constitute the double flow circuit fluid pumping device (123). The two fluid streams are pumped by the bidirectional fluid pumps (111, 112), which are capable of producing negative pressure or positive pressure of the double flow circuit fluid pumping device (123), are driven by the power source (300), and are operatively controlled by the operative control device (250) in different flow directions.

The heat exchange apparatus (1000) and the bidirectional fluid pumps (111, 112) capable of producing negative pressure or positive pressure are integrally combined or separately installed. The two bidirectional fluid pumps (111, 112) capable of producing negative pressure or positive pressure to form double flow circuit fluid pumping device (123) are respectively installed to fluid port (b) and fluid port (d) for pumping the fluid in different pumping flow directions, wherein the bidirectional fluid pumps (111, 112) capable of producing negative pressure or positive pressure are driven by individual electric motors or driven by a common motor and are operatively controlled by the operative control device (250) to have one or more than one of the following functional mode operations, as needed: 1) the two bidirectional fluid pumps (111, 112) are pumped in negative pressure to allow the two fluid streams to pass through the total heat exchanger (200) in different pumping flow directions; or 2) the two bidirectional fluid pumps (111, 112) are pumped in positive pressure to allow the two fluid streams to pass through the total heat exchanger (200) in different pumping flow directions. In the functional mode operations of items 1) & 2), the flow directions of the two fluid streams passing through the two sides of the total heat exchanger (200) inside the heat exchange apparatus (1000) are kept opposite to each other.

The at least one temperature detecting device (11) or at least one humidity detecting device (21) is installed at a position capable of directly or indirectly detecting the temperature variation or humidity variation, including installing both or at least one type of the detecting devices, wherein the detected signals are referred by the operative control device (250) to operatively control the double flow circuit fluid pumping device (123) for determining the flow rate operating timing of the pumping exchange fluid, and the temperature detecting device (11) and humidity detecting device (21) may be integrally commonly combined or individually separately installed.

The power source (300) is any device including an AC or DC city power system or independent power supply device to provide power source for the operation of the fixed type heat exchange apparatus with automatic exchange flow rate modulation.

The operative control device (250) is constituted by electromechanical components, solid state electronic components, or microprocessors and related software and operative control interfaces to operatively control the bidirectional fluid pumps (111, 112) of the double flow circuit fluid pumping device (123) by: 1) operatively controlling the switching functional operation; or 2) operatively controlling the flow rate of the pumping heat exchange fluid; or 3) operatively controlling the temperature distribution status between the fluid and the total heat exchanger (200) inside the heat exchange apparatus; or 4) operatively controlling the humidity distribution status in the total heat exchanger (200); or 5) integrally operatively controlling at least two of items 1), 2), 3) and 4) in combination.

The total heat exchanger (200) is the total heat exchanger in a conventional total heat exchange structure having two internal flow circuits and a heat absorbing or dissipating function as well as dehumidifying or humidifying functions, wherein the two flow circuits respectively individually have two fluid ports to respectively pump the fluid, so as to enable heat exchange and dehumidification functions between the two fluids.

The timing to operatively control the flow rate of heat exchange fluid is established by the following: 1) the fluid flow rate and change timing are preset in the open loop operative control; or 2) the timing is randomly manually operatively controlled; or 3) both or either one of the at least one temperature detecting device (11) and at least one humidity detecting device (21) are installed at positions capable of directly or indirectly detecting the temperature variation or humidity variation, wherein the detected signals are referred for operatively controlling the flow rate operating timing of the pumping exchange fluid.

Further, the bidirectional fluid pump (111) and the bidirectional fluid pump (112) can also be installed to fluid ports (a, d), or installed to fluid ports (b, c) in the embodiment of FIG. 6, wherein one bidirectional fluid pump is pumped in positive pressure while the other bidirectional fluid pump is pumped in negative pressure so as to allow the two fluid streams to pass through the total heat exchanger (200) in different pumping flow directions.

Figure 7:
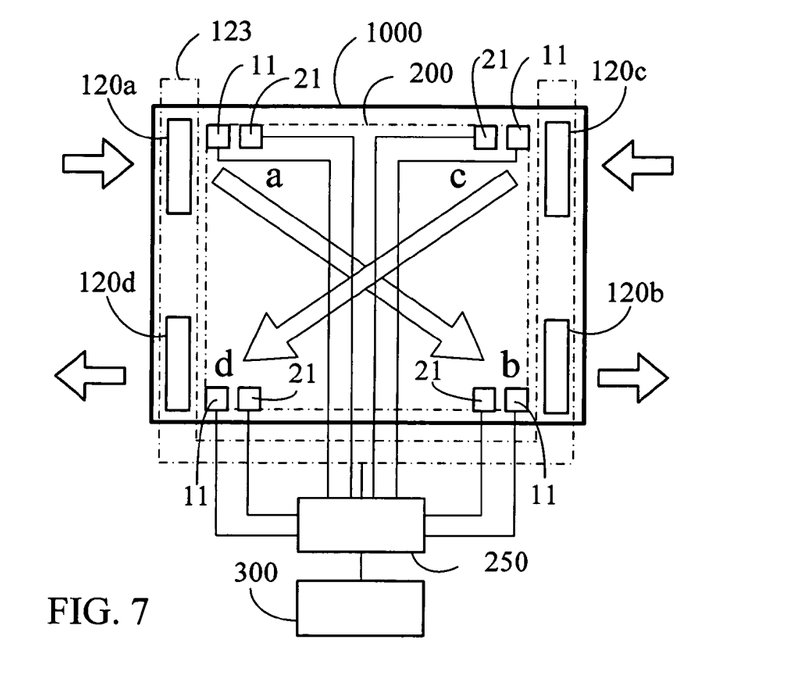
FIG. 7 is a second schematic view of an embodiment of the present invention that is further installed with the temperature detecting device and the humidity detecting device in the total heat exchanger application.

FIG. 7 is a second schematic view showing an embodiment of the present invention that is further installed with the temperature detecting device and the humidity detecting device in a total heat exchanger application.

As shown in FIG. 7, the unidirectional fluid pumps (120a, 120b, 120c, 120d) capable of pumping in unidirectional flow directions are respectively installed to the fluid port (a), fluid port (b), fluid port (c), and fluid port (d) of the two flow circuit for pumping the two double flow circuit fluids in the heat exchange apparatus (1000) to form the double flow circuit fluid pumping device (123). Using power from the power source (300) and control by the operative control device (250), the two fluid streams are pumped by the double flow circuit fluid pumping device (123) to pass through the heat exchanger (100) in different flow directions.

The heat exchange apparatus (1000) and unidirectional fluid pumps (120a, 120b, 120c, 120d) are integrally combined or separately installed to constitute the functions of the double flow circuit fluid pumping device (123). The four unidirectional fluid pumps (120a, 120b, 120c, 120d) are respectively installed to fluid port (a), fluid port (b), fluid port (c), and fluid port (d) for pumping the fluid, wherein the unidirectional fluid pumps (120a, 120c) installed to fluid port (a) and fluid port (c) are one group to be driven by the individual electric motors or driven by a common motor, while the unidirectional fluid pumps (120b, 120d) installed to fluid port (b) and fluid port (d) are another group to be driven by the individual electric motors or driven by a common motor, wherein the two groups are operatively controlled by the operative control device (250) to have one or more than one of the following functional modes, structural types, and operating methods: 1) the unidirectional fluid pumps are structurally distributed to pump the fluid in negative pressure, thereby allowing the two fluid streams to appear in different flow directions; or 2) the unidirectional fluid pumps are structurally distributed to pump the fluid in positive pressure, thereby allowing the two fluid streams to appear in different flow directions; or 3) the different fluid pumps among part or all of the unidirectional fluid pumps (120a, 120b, 120c, 120d) are pumped in positive pressure and negative pressures to form auxiliary pumping in the same flow circuit and allow the two fluid streams to be pumped in different flow directions.

The at least one temperature detecting device (11) or at least one humidity detecting device (21), or both the at least one temperature detecting device and at least one humidity detecting device are integrally commonly combined or separately installed at a position capable of directly or indirectly detecting a temperature variation or humidity variation, and the detected signals are referred by the operative control device (250) to operatively control the double flow circuit fluid pumping device (123) for determining the flow rate operating timing of the pumping exchange fluid.

The power source (300) is any device including an AC or DC city power system or independent power supply device to provide a power source for the operation of the fixed type heat exchange apparatus with automatic exchange flow rate modulation.

The operative control device (250) is constituted by electromechanical components, solid state electronic components, or microprocessors and related software and operative control interfaces to operatively control the unidirectional fluid pumps (120a, 120b, 120c, 120d) of the double flow circuit fluid pumping device (123) by: 1) operatively controlling the switching functional operation; or 2) operatively controlling the flow rate of pumping heat exchange fluid; or 3) operatively controlling the temperature distribution status between the fluid and the total heat exchanger (200) inside the heat exchange apparatus; or 4) operatively controlling the humidity distribution status in the total heat exchanger (200); or 5) integrally operatively controlling at least two of items 1), 2), 3) and 4) in combination.

The total heat exchanger (200) is the total heat exchanger in a conventional total heat exchange structure having two internal flow circuits and a heat absorbing or dissipating function as well as the dehumidifying or humidifying functions, wherein the two flow circuits respectively individually have two fluid ports to respectively pump the fluid, so as to enable heat exchange and dehumidification functions between the two fluids.

The timing to operatively control the flow rate of heat exchange fluid is may include the following: 1) the fluid flow rate and change timing are preset in the open loop operative control; or 2) the timing is randomly manually operatively controlled; or 3) both of either one of at least one temperature detecting device (11) and at least one humidity detecting device (21) are installed at a position capable of directly or indirectly detecting the temperature variation or humidity variation, wherein the detected signals are referred for operatively controlling the flow rate operating timing of the pumping exchange fluid.

The fixed type heat exchange apparatus with automatic flow rate exchange modulation may be further installed with three, or at least one or more of the following devices: a temperature detecting device (11), humidity detecting device (21), and gaseous or liquid state fluid composition detecting device (31), wherein the installation positions include both or one of the positions near to fluid port (a) and fluid port (b), or both or one of the positions near to fluid port (c) and fluid port (d) of the heat exchanger (100), total heat exchanger (200), or the heat exchange apparatus (1000), or other positions capable of detecting the temperature, humidity or composition of the exchange fluid during heat exchange operation, and the number of each type of detecting device can be one or more than one to provide detected signals for reference to execute one or more than one of the following operations: 1) as a reference for operatively controlling the double flow circuit fluid pumping device (123) to modulate the flow speed or flow rate of the pumping fluid; or 2) as a reference for operatively controlling the opening percentage of the fluid valve to modulate the flow speed or flow rate of the pumping fluid. For said temperature detecting device (11), humidity detecting device (21), and gaseous or liquid state fluid composition detecting device (31), all or some of the detecting devices are integrally combined, or they re individually separately installed.

Figure 8:
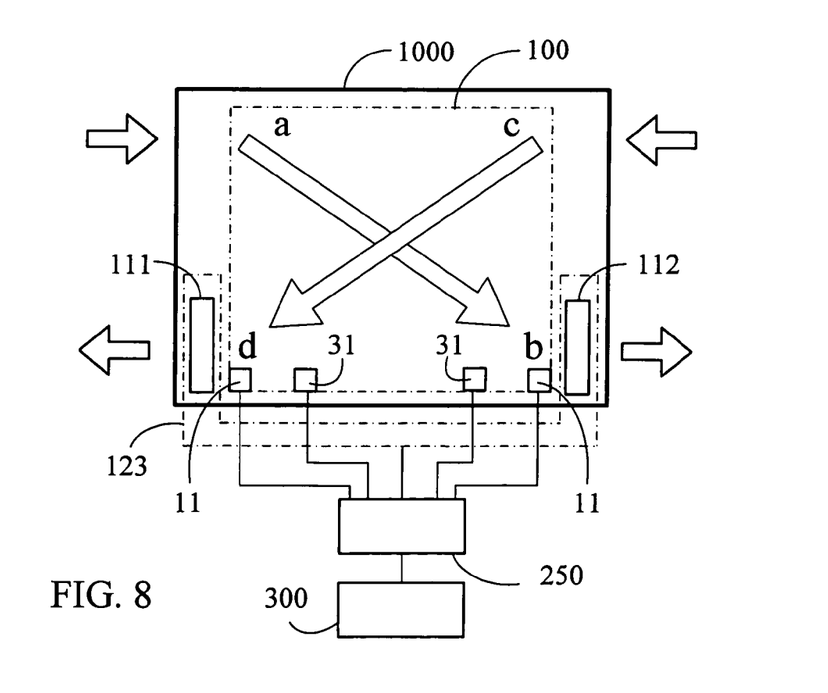
FIG. 8 is a schematic view an embodiment of the present invention that is further installed with the temperature detecting device and a gaseous or liquid state fluid composition detecting device.

FIG. 8 is a schematic view of an embodiment of the present invention further installed with a temperature detecting device and a gaseous or liquid state fluid composition detecting device;

As shown in FIG. 8, the fluid port (b) and fluid port (d) among the fluid port (a), fluid port (b), fluid port (c), and fluid port (d) of the double flow circuit of the heat exchange apparatus (1000) are respectively installed with the bidirectional fluid pumps (111, 112) capable of producing negative pressure or positive pressure to form the double flow circuit fluid pumping device (123), and the two fluid streams are pumped by the bidirectional fluid pumps (111, 112) capable of producing negative pressure or positive pressure of the double flow circuit fluid pumping device (123) being driven by the power source (300) and operatively controlled by the operative control device (250) to pass through the heat exchanger (100) in different flow directions.

The heat exchange apparatus (1000) and the bidirectional fluid pumps (111, 112) capable of producing negative pressure or positive pressure are integrally combined or separately installed to fluid port (b) and fluid port (d) for pumping the fluid in different pumping flow directions, wherein said bidirectional fluid pumps (111, 112) capable of producing negative pressure or positive pressure driven by the individual electric motors or driven by a common motor are operatively controlled by the operative control device (250) to have one or more than one of the following functional modes as needed: 1) the two bidirectional fluid pumps (111, 112) are pumped in negative pressure to allow the two fluid streams to pass through the heat exchanger (100) in different pumping flow directions; or 2) the two bidirectional fluid pumps (111, 112) are pumped in positive pressure to allow the two fluid streams to pass through the heat exchanger (100) in different pumping flow directions.

The least one temperature detecting device (11) is installed at a position capable of directly or indirectly detecting the temperature variation of the exchange fluid, and/or the at least one gaseous or liquid state fluid composition detecting device (31) is installed at a position capable of detecting the composition variation of the pumping gaseous or liquid state fluid, either by being integrally combined or separately installed, wherein the detected signals are referred by the operative control device (250) to operatively control the double flow circuit fluid pumping device (123) for determining the flow rate operating timing of the pumping exchange fluid.

The power source (300) is any device including an AC or DC city power system or an independent power supply device to provide a power source for the operation of the fixed type heat exchange apparatus with automatic exchange flow rate modulation.

The operative control device (250) is constituted by electromechanical components, solid state electronic components, or microprocessors and related software and operative control interfaces to operatively control the bidirectional fluid pumps (111, 112) constituting the double flow circuit fluid pumping device (123) by: 1) operatively controlling the switching functional operation; or 2) operatively controlling the flow rate of the pumping heat exchange fluid; or 3) operatively controlling the temperature distribution status between the fluid and the heat exchanger (100) inside the heat exchange apparatus (1000); or 4) operatively controlling the interflow status of the gaseous or liquid state fluid compositions for heat exchange between the two sides of the heat exchange apparatus (1000); or 5) integrally operatively controlling at least two of items 1), 2), 3) and 4) in combination;

The heat exchanger (100) is the heat exchanger in a conventional heat exchange structure having two internal flow circuits and a heat absorbing or dissipating function, wherein the two flow circuits respectively individually have two fluid ports to respectively pump the fluid, so as to enable heat exchange between the two fluids.

The timing to operatively control the flow rate of heat exchange fluid is established or controlled as follows: 1) the fluid flow rate and change timing are preset in the open loop operative control; or 2) the timing is randomly manually operatively controlled; or 3) both or either one of at least one temperature detecting device (11) and at least one gaseous or liquid state fluid composition detecting device (31) are installed at positions capable of directly or indirectly detecting the temperature variation or gaseous or liquid state fluid composition variation, and the detected signals are referred-to for operatively controlling the flow rate operating timing of the pumping exchange fluid.

Further, in the embodiment of FIG. 8, the bidirectional fluid pump (111) and bidirectional fluid pump (112) may be installed to fluid ports (a, d) or installed to fluid ports (b, c), wherein one bidirectional fluid pump is pumped in positive pressure, while the other bidirectional fluid pump is pumped in negative pressure so as to allow the two fluid streams to pass through the heat exchanger (100) in different pumping flow directions.

Figure 9:
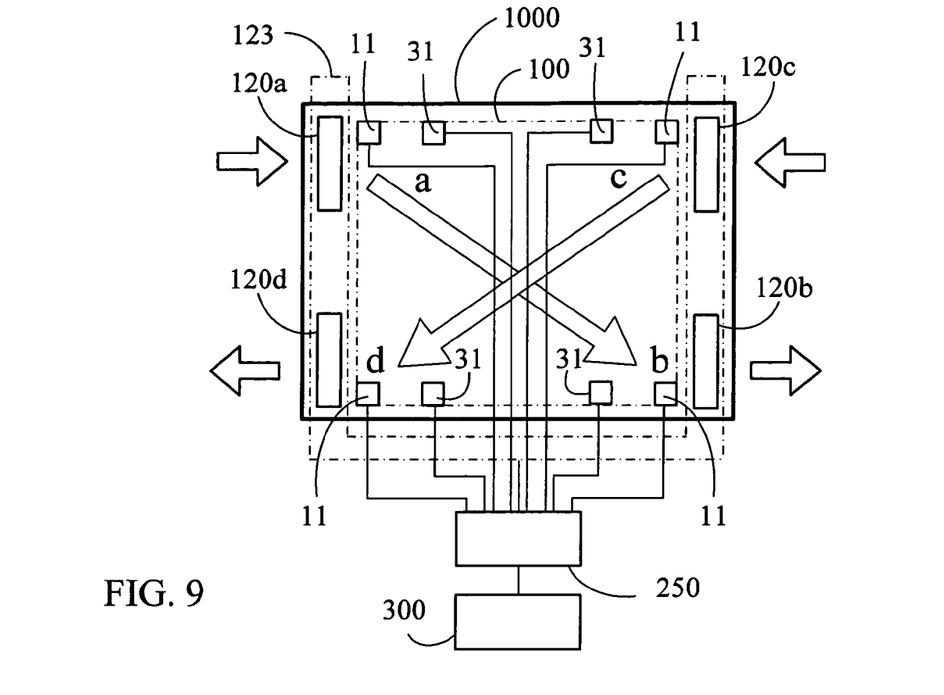
FIG. 9 is a schematic view of an embodiment of the present invention that is further installed with the temperature detecting device and the gaseous or liquid state fluid composition detecting device.

FIG. 9 is a schematic view of an embodiment of the present invention that is further installed with the temperature detecting device and the gaseous or liquid state fluid composition detecting device.

As shown in FIG. 9, the fluid port (a), fluid port (b), fluid port (c), and fluid port (d) of the double flow circuit of the heat exchange apparatus (1000) are respectively installed with the unidirectional fluid pumps (120a, 120b, 120c, 120d), which are pumped in unidirectional flow directions to constitute the double flow circuit fluid pumping device (123), and the two fluid streams pumped by the double flow circuit fluid pumping device (123) are driven by the power source (300) and operatively controlled by the operative control device (250) to pass through the heat exchanger (100) in different flow directions, wherein the heat exchange apparatus (1000) and unidirectional fluid pumps (120a, 120b, 120c, 120d) may be integrally combined or separately installed to provide the functions of the double flow circuit fluid pumping device (123).

The unidirectional fluid pumps (120a, 120c) installed to fluid port (a) and fluid port (c) are one group to be driven by individual electric motors or driven by a common motor, while the unidirectional fluid pumps (120b, 120d) installed to fluid port (b) and fluid port (d) are another group to be driven by the individual electric motors or driven by a common motor The pumps are operatively controlled by the operative control device (250) to have one or more than one of the following functional modes, structural types and operating methods: 1) the unidirectional fluid pumps are structurally distributed to pump the fluid in negative pressure, thereby allowing the two fluid streams to appear in different flow directions; or 2) the unidirectional fluid pumps are structurally distributed to pump the fluid in positive pressure, thereby allowing the two fluid streams to appear in different flow directions; or 3) the different fluid pumps among part or all of the unidirectional fluid pumps (120a, 120b, 120c, 120d) are pumped in positive pressure and negative pressures to form auxiliary pumping in the same flow circuit and allow the two fluid streams to be pumped in different flow directions. In the functional modes of items 1), 2) and 3), the flow directions of the two fluid streams passing through the two sides of the heat exchanger (100) inside the heat exchange apparatus (1000) are kept opposite to each other.

The at least one temperature detecting device (11) is installed at a position capable of directly or indirectly detecting the temperature variation of the exchange fluid, and at least one gaseous or liquid state fluid composition detecting device (31) is installed at a position capable of detecting the composition variation of the pumping gaseous or liquid state fluid, including installing both or at least one type of detecting devices, wherein the detected signals are referred by the operative control device (250) to operatively control the double flow circuit fluid pumping device (123) for determining the flow rate operating timing of the pumping exchange fluid, the temperature detecting device (11) and gaseous or liquid state fluid composition detecting device (31) being integrally commonly combined or individually separately installed.

The power source (300) is any device including an AC or DC city power system or independent power supply device to provide a power source for the operation of the fixed type heat exchange apparatus with automatic exchange flow rate modulation.

The operative control device (250) is constituted by electromechanical components, solid state electronic components, or microprocessors and related software and operative control interfaces to operatively control the unidirectional fluid pumps (120a, 120b, 120c, 120d) of the double flow circuit fluid pumping device (123) by: 1) operatively controlling the switching functional operation; or 2) operatively controlling the flow rate of the pumping heat exchange fluid; or 3) operatively controlling the temperature distribution status of the fluid and the heat exchanger (100) inside the heat exchange apparatus (1000); or 4) operatively controlling the interflow status of the gaseous or liquid state fluid compositions for heat exchange between the two sides of heat exchange apparatus (1000); or 5) integrally operatively controlling at least two of items 1), 2), 3) and 4) in combination.

The heat exchanger (100) is the heat exchanger in a conventional heat exchange structure having two internal flow circuits and a heat absorbing or dissipating function, wherein the two flow circuits respectively individually have two fluid ports to respectively pump the fluid, so as to enable heat exchange between the two fluids.

The timing to operatively control the flow rate of heat exchange fluid is achieved in the following manner: 1) the fluid flow rate and change timing are preset in the open loop operative control; or 2) the timing is randomly manually operatively controlled; or 3) both or either one of at least one temperature detecting device (11) and at least one gaseous or liquid state fluid composition detecting device (31) are installed at the positions capable of directly or indirectly detecting the temperature variation or gaseous or liquid state fluid composition variation, wherein the detected signals are referredto for operatively controlling the flow rate operating timing of the pumping exchange fluid.

Figure 10:
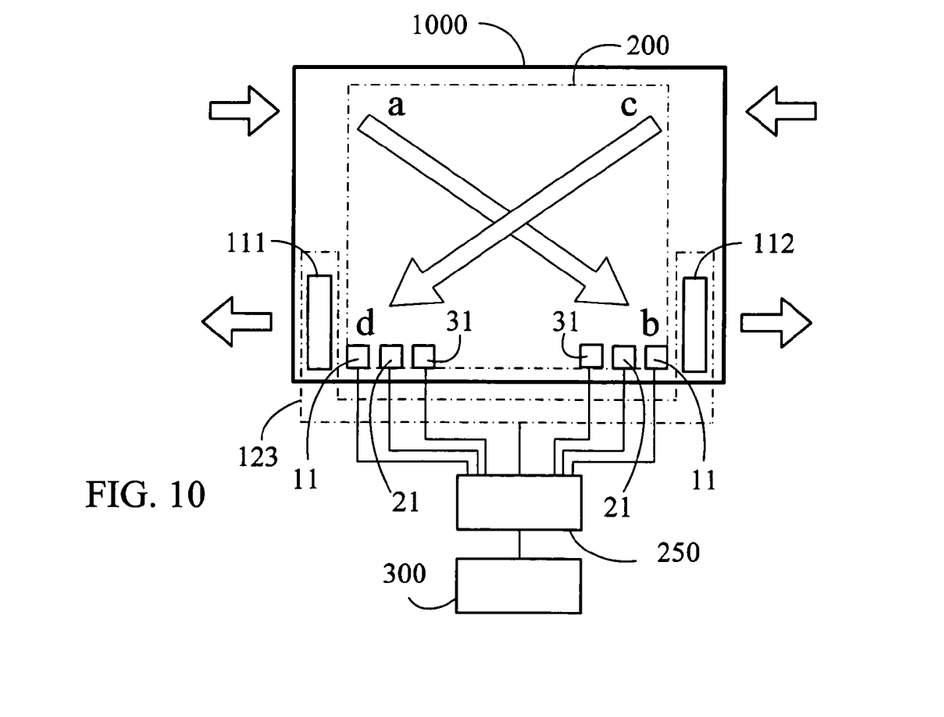
FIG. 10 is a schematic view of an embodiment of the present invention that is further installed with the temperature detecting device, a humidity detecting device, and the gaseous or liquid state fluid composition detecting device.

FIG. 10 is a schematic view of an embodiment of the present invention is further installed with a temperature detecting device, a humidity detecting device, and a gaseous or liquid state fluid composition detecting device.

As shown in FIG. 10, the fluid port (b) and fluid port (d) among the fluid port (a), fluid port (b), fluid port (c), and fluid port (d) of the double flow circuit of the heat exchange apparatus (1000) are respectively installed with bidirectional fluid pumps (111, 112) capable of producing negative pressure or positive pressure to form a double flow circuit fluid pumping device (123), and the two fluid streams are pumped by the bidirectional fluid pumps (111, 112) capable of producing negative pressure or positive pressure of the double flow circuit fluid pumping device (123), which is driven by the power source (300) and operatively controlled by the operative control device (250) in different flow directions.

The heat exchange apparatus (1000) and the bidirectional fluid pumps (111, 112) capable of producing negative pressure or positive pressure are integrally combined or separately installed. The two bidirectional fluid pumps (111, 112) capable of producing negative pressure or positive pressure constituting the functions of double flow circuit fluid pumping device (123) are respectively installed to fluid port (b) and fluid port (d) for pumping the fluid in different pumping flow directions, wherein the bidirectional fluid pumps (111, 112) capable of producing negative pressure or positive pressure and driven by the individual electric motors or driven by a common motor are operatively controlled by the operative control device (250) to have one or more than one functional mode operations of the following as needed: 1) the two bidirectional fluid pumps (111, 112) are pumped in negative pressure to allow the two fluid streams passing through the total heat exchanger (200) in different pumping flow directions; or 2) the two bidirectional fluid pumps (111, 112) are pumped in positive pressure to allow the two fluid streams passing through the total heat exchanger (200) in different pumping flow directions. In the functional modes 1) 2), the flow directions of the two fluid streams passing through the two sides of the total heat exchanger (200) inside the heat exchange apparatus (1000) are kept opposite to each other.

The at least one temperature detecting device (11), at least one humidity detecting device (21), and/or at least one gaseous or liquid state fluid composition detecting device (31) are installed at positions capable of directly or indirectly detecting the temperature variation, or humidity variation, or gaseous or liquid state fluid composition variation, wherein the detected signals are referred to by the operative control device (250) to operatively control the double flow circuit fluid pumping device (123) for determining the flow rate operating timing of the pumping exchange fluid.

The temperature detecting device (11) and humidity detecting device (21) as well as the gaseous or liquid state fluid composition detecting device (31) may be integrally commonly combined or individually separately installed.

The power source (300) is any device including an AC or DC city power system or independent power supply device that provides a power source for the operation of the fixed type heat exchange apparatus with automatic exchange flow rate modulation.

The operative control device (250) is constituted by electromechanical components, solid state electronic components, or microprocessors and related software and operative control interfaces to operatively control the bidirectional fluid pumps (111, 112) of the double flow circuit fluid pumping device (123) by: 1) operatively controlling the switching functional operation; or 2) operatively controlling the flow rate of the pumping heat exchange fluid; or 3) operatively controlling the temperature distribution status between the fluid and the total heat exchanger (200) inside the heat exchange apparatus; or 4) operatively controlling the humidity distribution status in the total heat exchanger (200); or 5) operatively controlling the interflow status of gaseous or liquid state fluid compositions for heat exchange between the two sides of the heat exchange apparatus (1000); or 6) integrally operatively controlling at least two of items 1), 2), 3), 4) and 5) in combination.

The total heat exchanger (200) is the total heat exchanger in a conventional total heat exchange structure having two internal flow circuits and a heat absorbing or dissipating function as well as dehumidifying or humidifying functions, wherein the two flow circuits respectively individually have two fluid ports to respectively pump the fluid, so that to enable heat exchange and dehumidification functions between the two fluids.

The timing to operatively control the flow rate of heat exchange fluid is such that: 1) the fluid flow rate and change timing are preset in the open loop operative control; or 2) The timing is randomly manually operatively controlled; or 3) at least one temperature detecting device (11), at least one humidity detecting device (21), and at least one gaseous or liquid state fluid composition detecting device (31) are installed at the position capable of directly or indirectly detecting the temperature variation, or humidity variation, or gaseous or liquid state fluid composition variation. All three or at least one type of the detecting devices may be installed, wherein the detected signals are referred to for operatively controlling the flow rate operating timing of the pumping exchange fluid.

Further, the bidirectional fluid pump (111) and the bidirectional fluid pump (112) can also be installed to fluid ports (a, d), or installed to fluid ports (b, c) in the embodiment of FIG. 10, wherein one bidirectional fluid pump is pumped in positive pressure, while the other bidirectional fluid pump is pumped in negative pressure so as to allow the two fluid streams to pass through the total heat exchanger (200) in different pumping flow directions.

Figure 11:
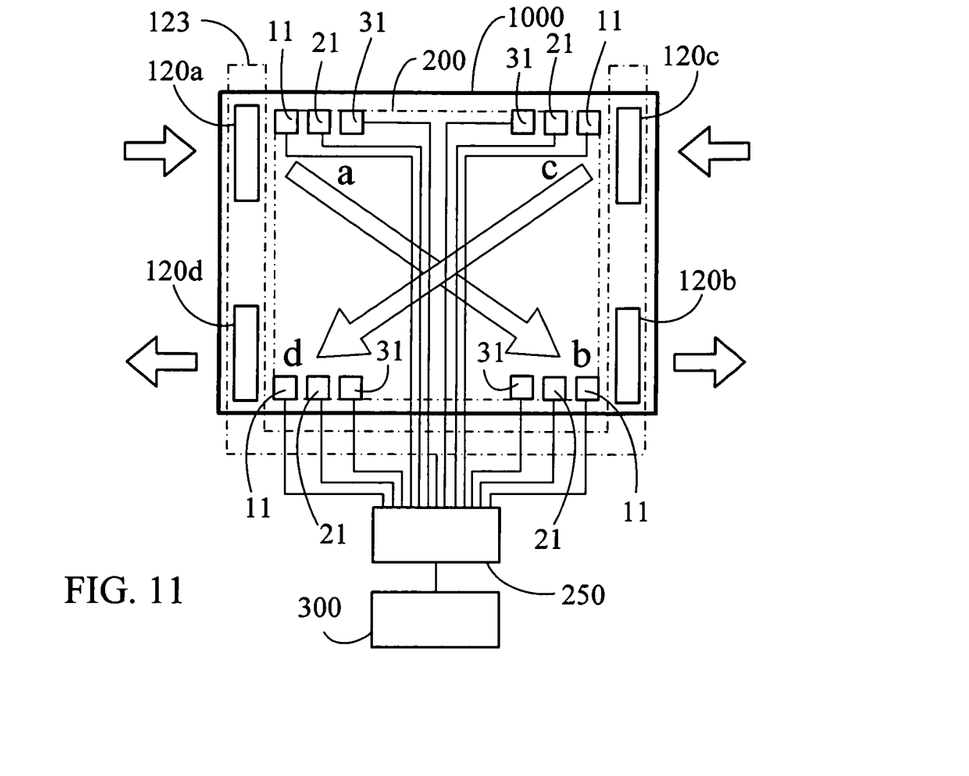
FIG. 11 is a schematic view of an embodiment of the present invention that is further installed with the temperature detecting device, the humidity detecting device, and the gaseous or liquid state fluid composition detecting device.

FIG. 11 is schematic view of an embodiment of the present invention that is further installed with the temperature detecting device, the humidity detecting device, and the gaseous or liquid state fluid composition detecting device.

As shown in FIG. 11, the unidirectional fluid pumps (120a, 120b, 120c, 120d) able to be pumped in unidirectional flow directions are respectively installed to fluid port (a), fluid port (b), fluid port (c), and fluid port (d) of the double flow circuit of the heat exchange apparatus (1000) for pumpin two double circuit fluids and form the double flow circuit fluid pumping device (123). The two fluid streams are pumped by the double flow circuit fluid pumping device (123) driven by the power source (300) and operatively controlled by the operative control device (250) in different flow directions.

The heat exchange apparatus (1000) and unidirectional fluid pumps (120a, 120b, 120c, 120d) are integrally combined or separately installed to constitute the functions of the double flow circuit fluid pumping device (123). The four unidirectional fluid pumps (120a, 120b, 120c, 120d) are respectively installed to fluid port (a), fluid port (b), fluid port (c), and fluid port (d) for pumping the fluid, wherein the unidirectional fluid pumps (120a, 120c) installed to fluid port (a) and fluid port (c) are one group to be driven by individual electric motors or driven by a common motor, while the unidirectional fluid pumps (120b, 120d) installed to fluid port (b) and fluid port (d) are another group to be driven by the individual electric motors or driven by the common motor, wherein they are operatively controlled by the operative control device (250) to have one or more than one of the following functional modes, structural types and operating methods: 1) the unidirectional fluid pumps are structurally distributed to pump the fluid in negative pressure, thereby allowing the two fluid streams to appear in different flow directions; or 2) the unidirectional fluid pumps are structurally distributed to pump the fluid in positive pressure, thereby allowing the two fluid streams to appear in different flow directions; or 3) the different fluid pumps among part or all of the unidirectional fluid pumps (120a, 120b, 120c, 120d) are pumped in positive pressure and negative pressures to form auxiliary pumping in the same flow circuit and allow the two fluid streams to be pumped in different flow directions.

The at least one temperature detecting device (11), at least one humidity detecting device (21), and at least one gaseous or liquid state fluid composition detecting device (31) are installed at the position capable of directly or indirectly detecting the temperature variation, or humidity variation, or gaseous or liquid state fluid composition variation.

All three or at least one type of the detecting devices may be installed, the detected signals being referred-to by the operative control device (250) to operatively control the double flow circuit fluid pumping device (123) for determining the flow rate operating timing of the pumping exchange fluid.

The temperature detecting device (11), humidity detecting device (21) and gaseous or liquid state fluid composition detecting device (31) are integrally commonly combined or individually separately installed.

The power source (300) is any device including an AC or DC city power system or independent power supply device arranged to provide a power source for operation of the fixed type heat exchange apparatus with automatic exchange flow rate modulation.

The operative control device (250) is constituted by electromechanical components, solid state electronic components, or microprocessors and related software and operative control interfaces to operatively control the unidirectional fluid pumps (120a, 120b, 120c, 120d) of the double flow circuit fluid pumping device (123) by: 1) operatively controlling the switching functional operation; or 2) operatively controlling the flow rate of the pumping heat exchange fluid; or 3) operatively controlling the temperature distribution status between the fluid and the total heat exchanger (200) inside the heat exchange apparatus; or 4) operatively controlling the humidity distribution status in the total heat exchanger (200); or 5) operatively controlling the interflow status of gaseous or liquid state fluid compositions for heat exchange between the two sides of the heat exchange apparatus (1000); or 6) integrally operatively controlling at least two of said items 1), 2), 3), 4) and 5) in combination.

The total heat exchanger (200) is the total heat exchanger in a conventional total heat exchange structure having two internal flow circuits and a heat absorbing or dissipating function as well as dehumidifying or humidifying functions, wherein the two flow circuits respectively individually have two fluid ports to respectively pump the fluid, so as to enable heat exchange and dehumidification functions between the two fluids.

The timing to operatively control the flow rate of heat exchange fluid is such that: 1) the fluid flow rate and change timing are preset in the open loop operative control; or 2) it is randomly manually operatively controlled; or 3) three or at least one of at least one temperature detecting device (11), at least one humidity detecting device (21), and at least one gaseous or liquid state fluid composition detecting device (31) are installed at the positions capable of directly or indirectly detecting the temperature variation, or humidity variation, or gaseous or liquid state fluid composition variation, wherein the detected signals are referredto for operatively controlling the flow rate operating timing of the pumping exchange fluid.

The structural types of the heat exchanger or total heat exchanger in the fixed type heat exchange apparatus with automatic flow rate exchange modulation include one or more than one of the following characteristics: 1) a tubular structure in linear or other geometric shape; or 2) a multi-layer structure with fluid circuits for passing the gaseous or liquid state liquid fluid; or 3) one or more than one fluid circuit in series connection, parallel connection, or series and parallel connection.

The fixed type heat exchange apparatus with automatic flow rate exchange modulation is further installed with three or at least one or more than one of the following detecting devices: temperature detecting device (11), humidity detecting device (21), and gaseous or liquid state fluid composition detecting device (31), wherein the installation positions include both or one of the positions near to fluid port (a) and fluid port (b), or both or one of the positions near to fluid port (c) and fluid port (d) of the heat exchanger (100), the total heat exchanger (200), or the heat exchange apparatus (1000), or other positions capable of detecting the temperature, humidity or composition of the exchange fluid during heat exchange operation. The detecting devices provide detected signals for reference to execute one or more than one of the following functional operations: 1) as the reference for operatively controlling the double flow circuit fluid pumping device (123) to modulate the flow speed or flow rate of the pumping fluid; or 2) as the reference for operatively controlling the opening percentage of the fluid valve to modulate the flow speed or flow rate of the pumping fluid.

The temperature detecting device (11), humidity detecting device (21), and gaseous or liquid state fluid composition detecting device (31), are all integrally combined, or part of the detecting devices are integrally combined, or they are individually separately installed.

The double flow circuit fluid pumping device (123) of the present invention is configured for pumping gaseous or liquid state fluids, wherein the double flow circuit fluid pumping device (123) can not only be driven by individual electric motors or a common electric motor, but they also can be driven by engine power, or mechanical or electric power converted from wind power, thermal energy, temperature-difference energy, or solar energy.

The operative control device (250) of the present invention is equipped with an electric motor, or controllable engine power, or mechanical or electric power generated or converted from other wind energy, thermal energy, temperature-difference energy, or solar energy for controlling driving of various fluid pumps, or controlling the operation timing of the fluid pumps or fluid valves, thereby changing the direction of the two fluid streams passing through the heat exchanger (100), and further for partial or complete regulation of rotational speed, flow rate, or fluid pressure of the various fluid pumps.

For the fixed type heat exchange apparatus with automatic flow rate exchange modulation of present invention, the flow rate of the fluids pumped by the double flow circuit fluid pumping device (123) can further be operatively controlled by the operative control device (250) to include one or more than one of the following operative control modes:

1) The adjustment or setting of the pumping fluid flow rate is manually operatively controlled;

2) The fluid flow rate is operatively controlled by referring to the signal detected by at least one installed temperature detecting device;

3) The fluid flow rate is operatively controlled by referring to the signal detected by at least one installed humidity detecting device;

4) The fluid flow rate is operatively controlled by referring to the signal detected by at least one installed gaseous or liquid state fluid composition detecting device;

5) The fluid flow rate is operatively controlled by combining two or more than two methods of items 1)~4).

In setting up the flow rate operative control function of the fixed type heat exchange apparatus with automatic flow rate exchange modulation of present invention, the fluid flow rate operative control range may include stepped or stepless fluid flow rate modulations from no transportation to a maximum transportation rate, as follows:

1) By operatively controlling the rotational speed of the double flow circuit fluid pumping device (123) within the range from cease of transportation to maximum transportation rate to further operatively control the fluid flow rate;

2) By adopting the double flow circuit fluid pumping device (123) being installed with operatively controllable fluid inlet/outlet valves to operatively control the opening of the fluid inlet/outlet valves of the double flow circuit fluid pumping device (123) to further operatively control the fluid flow rate; or 3) By operatively controlling any one device of items 1)~2) to pump the fluid intermittently so as to modulate the average flow rate by the on/off pumping time ratio.

The flow rate ratio between the two fluid streams of the fixed type heat exchange apparatus with automatic flow rate exchange modulation of the present invention pass through the heat exchange apparatus (1000) during operation according to one or morethan one of the following ratios:

1) The flow rate of fluid in one flow circuit is greater than the one in the other flow circuit;

2) The flow rates of the fluids in both flow circuits are the same; or

3) Two fluid pumps in different pumping flow directions are alternatively operated to alternatively pump the two fluid streams in opposite flow directions.

For the fixed type heat exchange apparatus with automatic flow rate exchange modulation of present invention, in addition to the operating function of pumping fluids of the double flow circuit in different flow directions, the double flow circuit fluid pumping device (123) constituted by two bidirectional fluid pumps may, through operatively controlling the pumping flow directions of the two fluid streams, further have one or more than one of the following special operating modes:

1) Operatively controlling the fluids in two flow circuits to be pumped in the same flow directions for pumping in fluids;

2) Operatively controlling the fluids in two flow circuits to be reversely pumped in the same flow directions for discharging fluids;

3) Operatively controlling the fluids in two flow circuits to be periodically pumped in positive and reverse flow directions for pumping in fluids in the same flow directions and discharging fluids in reverse flow directions.

The same directional pumping function of the two fluid streams can be applied to meet the need for emergency additional fluid flow rate pumping in or out.

The invention claimed is:

1. A heat exchange apparatus with automatic flow rate exchange modulation, comprising:
   a heat exchange apparatus four fluid ports (a,b,c,d) through which the at least one heat exchange fluid is pumped into and out of the heat exchange apparatus, wherein first and fourth ones of the fluid ports (a,d) are on a first side of the heat exchange apparatus and second and third ones of the fluid ports (b,c) are on a second side of the heat exchange apparatus;
   at least two fluid pumps (111,112 or 120a,120b,120c, 120d) that form a double flow circuit fluid pumping device (123) for pumping at least one heat exchange fluid through the heat exchange apparatus in the first direction via a first fluid flow port from the first fluid port (a) on the first side of the heat exchange apparatus to the second fluid port (b) on the second side of the heat exchange apparatus and in the second direction via a second fluid flow path from the third fluid port (c) on the second side of the heat exchange apparatus to the fourth fluid port (d) on the first side of the heat exchange apparatus, said first fluid flow path being different from the second fluid flow path;
   a power source (300) for supplying power to the at least two pumps; and
   an operative control device (250) for operatively controlling said at least two fluid pumps to perform at least one of the following operations in order to operatively control a temperature distribution with the heat exchange apparatus: (a) switching a pumping direction; (b) operatively controlling a flow rate of the fluid; (c) operatively controlling both the pumping direction and the flow rate, wherein a timing of said operations is preset in an open loop operative control or manually controlled.

2. The heat exchange apparatus claimed in claim 1, wherein said at least two fluid pumps are bidirectional fluid pumps installed at two said fluid ports.

3. The heat exchange apparatus claimed in claim 2, wherein said bidirectional fluid pumps are installed at two said four ports (a,b,c,d), said two ports being selected according to whether both of said bidirectional pumps are operated to generate positive pressure or negative pressure, or whether one of said bidirectional pumps is operated to generate positive pressure while the other of said two bidirectional pumps is operated to generate negative pressure.

4. The heat exchange apparatus claimed in claim 2, further comprising at least one temperature detecting device (11) installed at a position to directly or indirectly detect a temperature variation of a respective said heat exchange fluid, wherein the at least one temperature detecting device provides temperature detecting signals to said operative control device (250), and said operation of operatively controlling a temperature distribution status within the heat exchange apparatus including an operation of controlling a timing of said switching or said flow rate control to control said temperature distribution by using said temperature detecting signals as a reference.

5. The heat exchange apparatus claimed in claim 2, further comprising at least one temperature detecting device (11) or at least one humidity detecting device (21), said temperature detecting device (11) or humidity detecting device (21) installed at a position to directly or indirectly detect a temperature variation or a humidity variation within the heat exchange apparatus, wherein the at least one temperature detecting device (11) or humidity detecting device (21) respectively provide temperature or humidity detecting signals to said operative control device (250), said operation of operatively controlling a temperature distribution status within the heat exchange apparatus including an operation of controlling a timing of said switching or said flow rate control to control said temperature distribution by using said temperature detecting signals as a reference, and said humidity detecting device being arranged to provide humidity detecting signals to said operative control device (250) to operatively control a humidity distribution within said heat exchange apparatus by using said humidity detection signals as a reference to control said switching or flow rate timing.

6. The heat exchange apparatus claimed in claim 5, wherein said heat exchange apparatus includes both said at least one temperature detecting device (11) and said at least one humidity detecting device (12).

7. The heat exchange apparatus claimed in claim 2, further comprising at least one of the following: at least one temperature detecting device (11), at least one humidity detecting device (21), and at least one gaseous or liquid state fluid composition detecting device (31), said at least one temperature detecting device (11), humidity detecting device (21), or gaseous or liquid state fluid composition detecting device being installed at a position to directly or indirectly detect a temperature variation, a humidity variation, or a fluid composition variation within the heat exchange apparatus, wherein the at least one temperature detecting device (11), humidity detecting device (21), or gaseous or liquid state fluid composition detecting device (31) respectively provide temperature, humidity, or fluid composition detecting signals to said operative control device (250), said operation of operatively controlling a temperature distribution status within the heat exchange apparatus including an operation of controlling a timing of said switching or said flow rate control to control said temperature distribution by using said temperature detecting signals as a reference, said humidity detecting device being arranged to provide humidity detecting signals to said operative control device (250) to operatively control a humidity distribution within said heat exchange apparatus by using said humidity detection signals as a reference to control said switching or flow rate timing, and said gaseous or liquid state fluid composition detecting device being arranged to provide fluid composition detecting signals to said operative control device (250) as a reference to operatively control an inflow status of a respective said at least one heat exchange fluid.

8. The heat exchange apparatus claimed in claim 7, wherein said heat exchange apparatus includes two different ones of said at least one temperature detecting device (11), said at least one humidity detecting device (12), and said at least one temperature detecting device (31).

9. The heat exchange apparatus claimed in claim 7, wherein said operative control device (250) controls said switching or flow rate timing by operatively controlling said pumps.

10. The heat exchange apparatus claimed in claim 1, wherein said at least two fluid pumps include a first unidirectional pump (120a) installed at the first fluid port (a), a second unidirectional pump (120b) installed at the second fluid port (b), a third unidirectional pump (120c) installed at the third fluid port (c), and a fourth unidirectional pump (120d) installed at the fourth fluid port (d), wherein said first and second unidirectional fluid pumps (120a,120b) operate to pump fluid in the first direction and the third and fourth unidirectional pumps (120c,120d) operate to pump said fluid in the second direction, and wherein switching between operation of the first and second unidirectional pumps (120a, 120b) and operation of the third and fourth unidirectional pumps (120c,120d) switches a fluid flow direction within the heat exchange apparatus.

11. The heat exchange apparatus as claimed in claim 10, wherein at least one of said first and third unidirectional pumps (120a,120c) is operated to generate positive pressure and at least one of said second and fourth unidirectional pumps (120b,120d) is operated to generate negative pressure.

12. The heat exchange apparatus as claimed in claim 10, further comprising at least one temperature detecting device (11) installed at a position to directly or indirectly detect a temperature variation of a respective said heat exchange fluid, wherein the at least one temperature detecting device provides temperature detecting signals to said operative control device (250), and said operation of operatively controlling a temperature distribution status within the heat exchange apparatus including an operation of controlling a timing of said switching or said flow rate control to control said temperature distribution by using said temperature detecting signals as a reference.

13. The heat exchange apparatus as claimed in claim 10, further comprising at least one temperature detecting device (11) or at least one humidity detecting device (21), said temperature detecting device (11) or humidity detecting device (21) installed at a position to directly or indirectly detect a temperature variation or a humidity variation within the heat exchange apparatus, wherein the at least one temperature detecting device (11) or humidity detecting device (21) respectively provide temperature or humidity detecting signals to said operative control device (250), said operation of operatively controlling a temperature distribution status within the heat exchange apparatus including an operation of controlling a timing of said switching or said flow rate control to control said temperature distribution by using said temperature detecting signals as a reference, and said humidity detecting device being arranged to provide humidity detecting signals to said operative control device (250) to operatively control a humidity distribution within said heat exchange apparatus by using said humidity detection signals as a reference to control said switching or flow rate timing.

14. The heat exchange apparatus as claimed in claim 13, wherein said heat exchange apparatus includes both said at least one temperature detecting device (11) and said at least one humidity detecting device (12).

15. The heat exchange apparatus as claimed in claim 10, further comprising at least one of the following: at least one temperature detecting device (11), at least one humidity detecting device (21), and at least one gaseous or liquid state fluid composition detecting device (31), said at least one temperature detecting device (11), humidity detecting device (21), or gaseous or liquid state fluid composition detecting device (31) being installed at a position to directly or indirectly detect a temperature variation, a humidity variation, or a gaseous or liquid state fluid composition variation within the heat exchange apparatus, wherein the at least one temperature detecting device (11), humidity detecting device (21), or gaseous or liquid state fluid composition detecting device (31) respectively provide temperature, humidity, or fluid composition detecting signals to said operative control device (250), said operation of operatively controlling a temperature distribution status within the heat exchange apparatus including an operation of controlling a timing of said switching or said flow rate control to control said temperature distribution by using said temperature detecting signals as a reference, said humidity detecting device being arranged to provide humidity detecting signals to said operative control device (250) to operatively control a humidity distribution within said heat exchange apparatus by using said humidity detection signals as a reference to control said switching or flow rate timing, and said gaseous or liquid state fluid composition detecting device being arranged to provide fluid composition detecting signals to said operative control device (250) as a reference to operatively control an inflow status of a respective said at least one heat exchange fluid.

16. The heat exchange apparatus as claimed in claim 15, wherein said heat exchange apparatus includes two different ones of said at least one temperature detecting device (11), said at least one humidity detecting device (12), and said at least one temperature detecting device (31).

17. The heat exchange apparatus as claimed in claim 15, wherein said operative control device (250) controls said switching or flow rate timing by operatively controlling said unidirectional pumps.

18. The heat exchange apparatus as claimed in claim 1, wherein the control device (250) is arranged to operatively control a timing of said at least two fluid pumps (111,112 or 120a,120b,120c,120d) that form a double flow circuit fluid pumping device (123) to change a direction of the fluid passing through the heat exchange apparatus and further to provide at least partial regulation of pump rotational speed, flow rate, and fluid pressure of individual said at least two fluid pumps (111,112 or 120a,120b,120c,120d) that form a double flow circuit fluid pumping device (123).

19. The heat exchange apparatus as claimed in claim 1, further comprising at least one of a temperature detecting device, a humidity detecting device, and a gaseous or liquid state fluid composition detecting device, wherein the at least two fluid pumps (111,112 or 120a,120b,120c,120d) that form a double flow circuit fluid pumping device (123) are operatively controlled by the operative control device (250) according to at least one of the following operative control modes:
   (a) adjustment or setting of a pumping fluid flow rate is manually controlled;
   (b) the flow rate is operatively controlled by referring to a signal detected by at least one temperature detecting device;
   (c) the flow rate is operatively controlled by referring to a signal detected by at least one humidity detecting device;
   (d) the flow rate is operatively controlled by referring to a signal detected by at least one gaseous or liquid state gaseous or liquid state fluid composition detecting device; and
   (e) the flow rate is operatively controlled by two or more of said modes (a) to (d).

20. The heat exchange apparatus as claimed in claim 1, wherein operative control of flow rate of the at least one heat exchange fluid is achieved by:

(a) operatively controlling a rotational speed of said at least two fluid pumps (111,112 or 120*a*,120*b*,120*c*,120*d*) that form a double flow circuit fluid pumping device (123);

(b) operatively controlling said at least two fluid pumps (111,112 or 120*a*,120*b*,120*c*,120*d*) that form a double flow circuit fluid pumping device (123) to pump the fluid intermittently in order to modulate an average flow rate according to pumping on/off time ratio.

21. The heat exchange apparatus as claimed in claim 1, wherein a ratio of flow rates in said first and second fluid flow directions is one of the following:

(a) the flow rate in one said direction is greater than a flow rate in the other said direction;

(b) the flow rate in said directions is equal; and (c) said pumps operating in different directions alternately pump the fluid streams in said first and second directions.

22. The heat exchange apparatus as claimed in claim 1, wherein said at least two fluid pumps (111,112 or 120*a*,120*b*, 120*c*,120*d*) that form a double flow circuit fluid pumping device (123) are further arranged to pump said fluid into said heat exchange apparatus in same flow directions, to reversely pump said fluid out of said heat exchange apparatus, or to periodically pump said fluid into the heat exchange apparatus in same flow directions and out of said heat exchange apparatus in reverse flow directions.

\* \* \* \* \*